(12) United States Patent
Leavitt et al.

(10) Patent No.: US 10,088,104 B2
(45) Date of Patent: Oct. 2, 2018

(54) COMPOSITE PRESSURE TANK BOSS MOUNTING WITH PRESSURE RELIEF

(71) Applicant: Quantum Fuel Systems LLC, Lake Forest, CA (US)

(72) Inventors: Mark Leavitt, Laguna Hills, CA (US); Mark H. Warner, Foothill Ranch, CA (US); David Rea, Irvine, CA (US)

(73) Assignee: Quantum Fuel Systems LLC, Lake Forest, CA (US)

( * ) Notice: Subject to any disclaimer, the term of this patent is extended or adjusted under 35 U.S.C. 154(b) by 0 days.

(21) Appl. No.: 14/444,958

(22) Filed: Jul. 28, 2014

(65) Prior Publication Data

US 2016/0025266 A1 Jan. 28, 2016

(51) Int. Cl.
*B65D 6/40* (2006.01)
*F17C 1/16* (2006.01)
*F17C 1/06* (2006.01)

(52) U.S. Cl.
CPC .............. *F17C 1/16* (2013.01); *F17C 1/06* (2013.01); *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2223/0123* (2013.01); *F17C 2223/036* (2013.01); *F17C 2260/012* (2013.01); *F17C 2260/037* (2013.01); *F17C 2270/0168* (2013.01)

(58) Field of Classification Search
CPC ....... F17C 1/00; F17C 1/16; F17C 2205/0305
USPC ................................................ 220/601, 582
See application file for complete search history.

(56) References Cited

U.S. PATENT DOCUMENTS

| | | | |
|---|---|---|---|
| 5,853,096 A | 12/1998 | Bartur et al. | |
| 6,065,627 A * | 5/2000 | Johanson | B65D 39/08 220/284 |
| 8,397,938 B2 * | 3/2013 | Strack | F16J 12/00 220/582 |
| 8,602,249 B2 * | 12/2013 | Fawley | F16J 12/00 220/582 |
| 8,720,735 B2 * | 5/2014 | Terada | F16J 12/00 122/195 |
| 2003/0103832 A1 * | 6/2003 | Cords | F16B 33/02 411/308 |
| 2004/0155040 A1 * | 8/2004 | Stolzenfeld | B65D 39/086 220/89.4 |

(Continued)

OTHER PUBLICATIONS

International Patent Application No. PCT/US2015/041410; Int'l Search Report and the Written Opinion; dated Oct. 19, 2015; 16 pages.

(Continued)

*Primary Examiner* — Andrew T Kirsch
*Assistant Examiner* — Don M Anderson
(74) *Attorney, Agent, or Firm* — Baker Hostetler LLP

(57) ABSTRACT

Disclosed is a device and method of a system and an improved boss, the boss having a longitudinally extending body with a top surface having flange forming a planar bottom surface with a fluid connection through the boss further including a liner mounting connection (LMC) on the flange bottom surface; the LMC having a groove adapted to be threadably engaged with a liner neck; and, a migration passage fluidly connecting LMC to the fluid connection of the boss.

18 Claims, 9 Drawing Sheets

(56) References Cited

U.S. PATENT DOCUMENTS

| | | | |
|---|---|---|---|
| 2009/0283549 A1* | 11/2009 | Beranger | B05B 11/001 |
| | | | 222/321.7 |
| 2011/0101002 A1* | 5/2011 | Strack | F17C 1/00 |
| | | | 220/586 |
| 2011/0108557 A1 | 5/2011 | Tani et al. | |
| 2013/0152371 A1 | 6/2013 | Strack | |
| 2014/0103051 A1 | 4/2014 | Kanezaki et al. | |

OTHER PUBLICATIONS

International Patent Application No. PCT/US2015/041410; Int'l Preliminary Report on Patentability; dated Feb. 9, 2017; 13 pages.
European Patent Application No. 15826628.8; Extended Search Report; dated Dec. 14, 2017; 10 pages.

\* cited by examiner

COMPOSITE PRESSURE TANK BOSS MOUNTING WITH PRESSURE RELIEF

BACKGROUND

1. Field

This disclosure relates to a polar boss connection for a pressurized composite gaseous storage tank.

2. General Background

Motor vehicles may be fueled by gaseous fuels. Gaseous fuels are traditionally stored bound to chemical hydrides under low pressure or under higher pressure in tank structures. In transportation the weight of a vehicle, including fuel transporting vessels or tanks contributes to the Gross Vehicle Weight (GVW). The heavier a vehicle the more force that is needed to propel it, to stop it and the less weight it can carry.

Storage of gaseous fuel cylinders/tanks in a vehicles must meet crash safety requirements. Tank cylinders are measured in terms of burst pressure. If a cylinder has a 3000 psi rating it will have a burst strength (or failure rating) of 2-3 times that normal 3000 psi rating.

Gross Vehicle Weight Rating (GVWR). This is the rating that is calculated by the manufacturer as the amount of weight that the vehicle will be when the vehicle itself is weighed filled with fuel and loaded according to the manufacturer's specification.

There is an ongoing balance between safety and weight with respect to pressurized fuel in motor vehicles Traditional methods of reducing tank weight have included using plastic lined tanks wrapped in fibers.

FIG. 1-4 show traditional composite tank structure. Such composite pressure vessels "1" are constructed by wrapping reinforcing fibers in a binding matrix forming a wrapped region "2" over a plastic liner "5". The liner (FIG. 1) has a polar region "7" and a neck "9" near the polar region. The neck serves as a fill and dispensing end. Such a composite structure is both lightweight and strong. Each composite vessel defines a pressure chamber "11" which contains a pressurized fluid that is moved in a controlled manner in or out of the vessel.

To permit the controlled movement of fluids in or out of the pressure chamber, the liner's neck "9" is connected to boss 15 and the boss is typically threaded or otherwise shaped for connection to valves, gauges, tubes, and fixtures which can direct and control fluid flow. The boss is traditionally formed of metal or other gas impermeable and rigid material.

The boss typically includes a cylindrical neck 16 with a fluid 18 connection to the container formed by the liner which defines the pressure chamber. The boss is the interface between the pressure chamber and the environment outside the vessel. A mounting flange 19 is secured to one end of the neck 9 in the polar region 7. The flange 15, is larger than the pressure chamber orifice 10 and is secured to the liner of the pressure vessel to hold the boss in place.

The liner must be sealed very securely to the boss or fuel will leak. The liner is not impermeable to some gaseous fuels and some gas migrates into the wrapping region causing leakage from the pressure vessel.

DISCLOSURE

Briefly, gaseous fuel storage cylinders add weight to vehicles. Weight affects capacity to carry load, cost to operate and regulatory issues.

Cylindrical pressurized filament wrapped composite cylinders are a light-weight alternative to metal tanks for storing gaseous fuels. Such cylinder can withstand hoop and axial stresses applied internally of at least a quantity equal to the burst rating.

Disclosed herein are exemplary implementations of aspects of devices, systems and methods of a pressurized-gas storage boss assembly, with a liner defining a gas storage chamber and having a polar end portion with a substantially planar surface, having an access opening on the planar surface which is in fluid communication with the gas storage chamber, the liner further including a raised circular neck ring extending from the planar surface and surrounding the access opening, the raised circular ring having outer annular wall, a top wall and an inner annular wall, with a set of helical neck threads provided on the inner annular wall; a boss having a longitudinally extending body that has a top surface, a planar bottom surface with a fluid connection to serve as a fluid passageway through the polar boss to the gas storage chamber, the boss further including a liner mounting connection (LMC) on the flange bottom surface, the LMC has a groove adapted to be threadably engaged with the neck; including a top an outer annular wall which is substantially smooth and an internal annular wall which is helically threaded to engage the neck threads; wherein the boss is configured to be screwed onto the liner, via the neck such that the helical neck threads are engaged with the corresponding helical threads of the internal annular wall.

Disclosed herein are exemplary implementations of aspects of devices, systems and methods of a pressurized-gas storage boss assembly, with a liner defining a gas storage chamber and having a polar end portion with a substantially planar surface, having an access opening on the planar surface which is in fluid communication with the gas storage chamber, the liner further including a raised circular neck ring extending from the planar surface and surrounding the access opening, the raised circular ring having outer annular wall, a top wall and an inner annular wall, with a set of helical neck threads provided on the inner annular wall; a boss having a longitudinally extending body that has a top surface, a planar bottom surface with a fluid connection to serve as a fluid passageway through the polar boss to the gas storage chamber, the boss further including a liner mounting connection (LMC) on the flange bottom surface, the LMC has a groove adapted to be threadably engaged with the neck; including a top an outer annular wall which is substantially smooth and an internal annular wall which is helically threaded to engage the neck threads; an annular channel wall forms a passage which is part of the boss's fluid connection, a migration passage fluidly connects the LMC to the annular channel wall passage; and, wherein the boss is configured to be screwed onto the liner, via the neck such that the helical neck threads are engaged with the corresponding helical threads of the internal annular wall.

In some instances the above exemplars include an extended leg of the channel wall.

In some instances the above exemplars have a taper with an angle wherein the circular neck ring is tapered at an angle of $\phi$ corresponding to the angular taper $\alpha$ of the LMC.

In some instances the above exemplars have a when the helical threads of the liner neck and the boss groove have been engaged fully the leading edge of the top wall boarders or abuts a void in the boss which fluidly connects the LMC and gas chamber.

Disclosed herein are exemplary implementations of aspects of devices, systems and methods of a pressurized-gas storage boss assembly, with a liner defining a gas storage chamber and having an end portion with a substantially planar surface, having an access opening on the planar surface which is in fluid communication with the gas storage chamber, the liner further including a raised circular neck ring extending from the planar surface and surrounding the access opening, the raised circular ring having outer annular wall, a top wall and an inner annular wall, with a set of helical neck threads provided on the inner annular wall; a boss having a longitudinally extending body that has a top surface, a planar bottom surface with a fluid connection to serve as a fluid passageway through the polar boss to the gas storage chamber, the boss further including a liner mounting connection (LMC) on the flange bottom surface, the LMC has a groove adapted to be threadably engaged with the neck; including a top an outer annular wall which is substantially smooth and an internal annular wall which is helically threaded to engage the neck threads; an annular channel wall forms a passage which is part of the boss's fluid connection, a migration passage fluidly connects the LMC to the annular channel wall passage; wherein the boss is configured to be screwed onto the liner, via the neck such that the helical neck threads are engaged with the corresponding helical threads of the internal annular wall; and, a wrapping forms an outer shell around liner and the flange and a portion of the elongated boss body. In some instances there is an extended leg of the channel wall. In some instances the neck ring is tapered and the LMC is tapered with angles wherein the circular neck ring angle of φ corresponds to the taper α of the LMC.

In some instances the above exemplars have a when the helical threads of the liner neck and the boss groove have been engaged fully the leading edge of the top wall is adjacent to a void in the boss which has lower density than the LMC and liner and is in fluid connection with the gas chamber.

In some instances for the wrapped pressurized gas storage vessel when the helical threads of the liner neck and the boss groove have been engaged fully the LMC abuts a migration passage which is one of a void or a region of density which is lower than the density or the liner and boss, whereby gas migrating out of the liner or captured in the underside of the wrappings will move or migrate from the liner to the migration passage into the low density void.

In some instances for the wrapped pressurized gas storage vessel when the helical threads of the liner neck and the boss groove have been engaged fully and a valve is been connected to maintain the gas chamber under pressure the low density migration pathway is where gas migrating out of the liner, captured between the liner and underside of the wrappings, will move or migrate to the migration passage into the low density void.

Disclosed herein are exemplary implementations of aspects of a method of preventing sealing failure between a boss and liner of a pressurized-gas storage vessel, the method including placing a low density void in the fluid connection of a migration passage formed in a boss connected to a plastic liner wrapped in wrapping material; wherein the wrapped plastic liner forms a gas chamber which can be pressurized; and wherein gas that migrates from the gas chamber into or through the plastic liner moves to the low density void. In some instances a fluid connection through the open top of the boss with a threaded passageway open into the pressure chamber surrounded by the liner is blocked with a valve thereby sealing the pressure chamber.

Disclosed herein are exemplary implementations of aspects of an improved boss, the boss having a longitudinally extending body with a top surface having flange forming a planar bottom surface with a fluid connection through the boss further including a LMC on the flange bottom surface; the LMC having a groove adapted to be threadably engaged with a liner neck; and, a migration passage fluidly connecting LMC to the fluid connection through the boss.

DRAWINGS

The above-mentioned features of the present disclosure will become more apparent with reference to the following description taken in conjunction with the accompanying drawings wherein like reference numerals denote like elements and in which.

Figure 1:
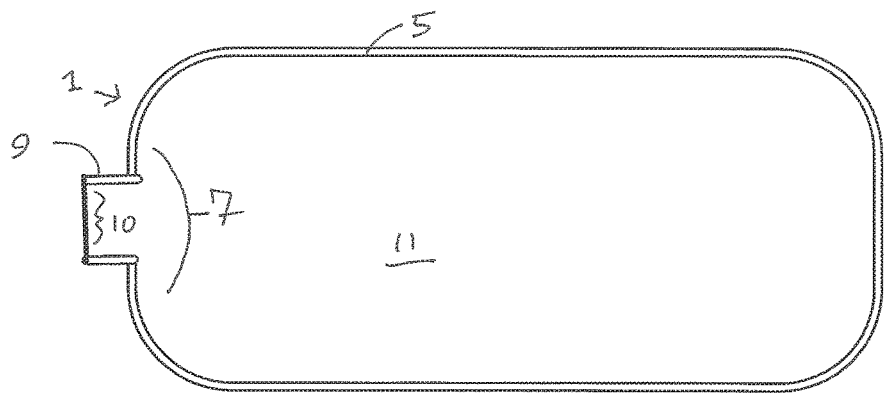
FIG. 1 is a cut-away view of a traditional liner.
Figure 2:
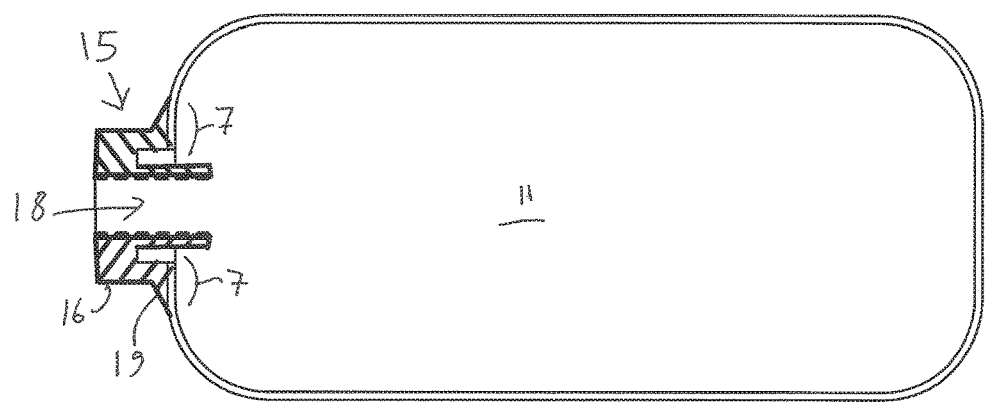
FIG. 2 is cut-away view of a boss-liner combination.
Figure 3:
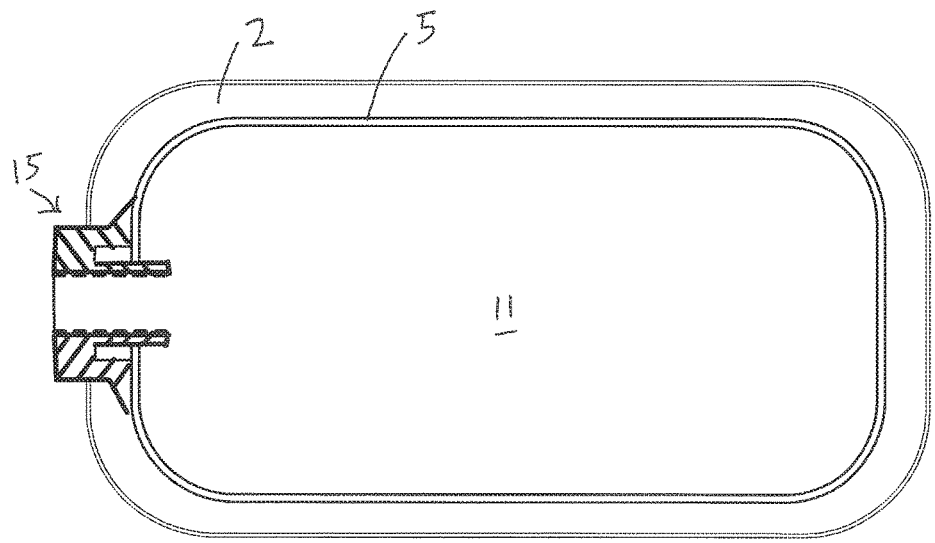
FIG. 3 is a cut-away view of a pressurized composite tank for storing gaseous fuel.
Figure 4:
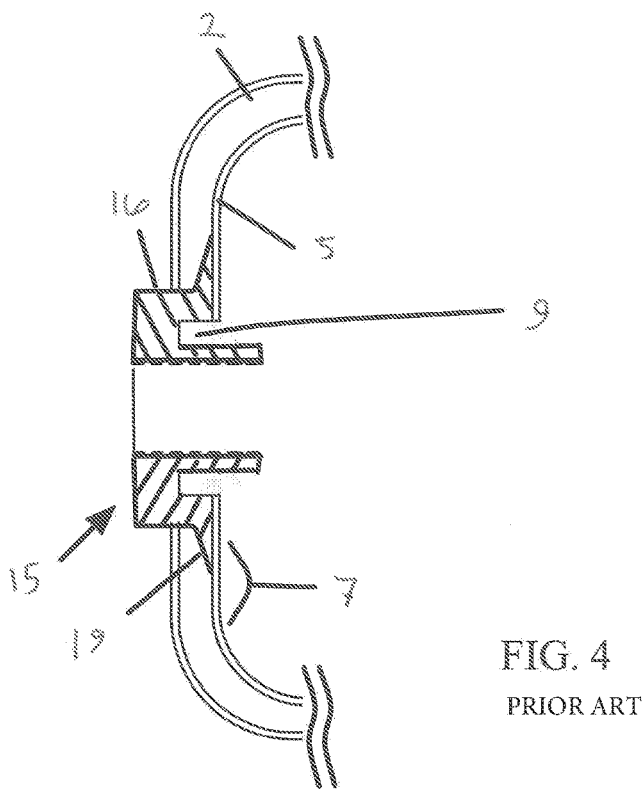
FIG. 4 is a close up partial cut-away view of the polar end of a traditional composite pressure vessel.
Figure 5:
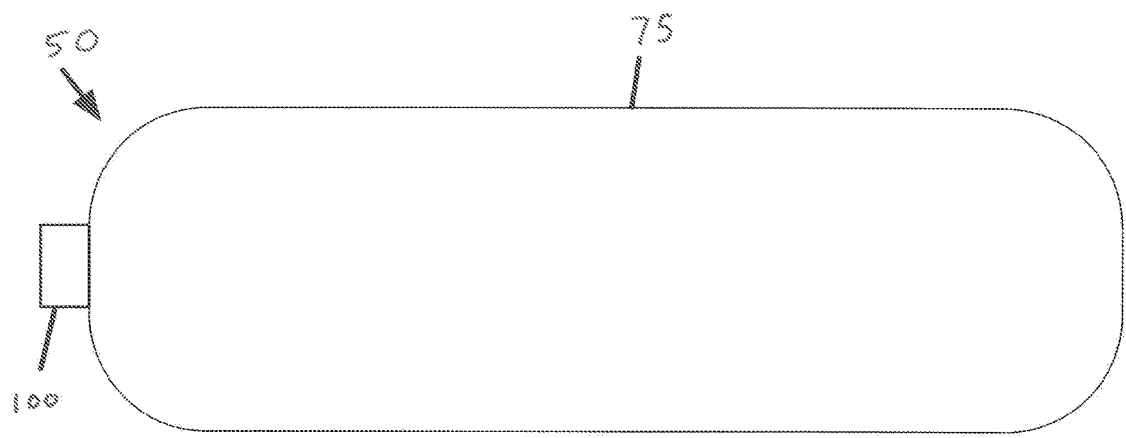
FIG. 5 is an external view of aspects of a composite pressure vessel disclosed herein.
Figure 6A:
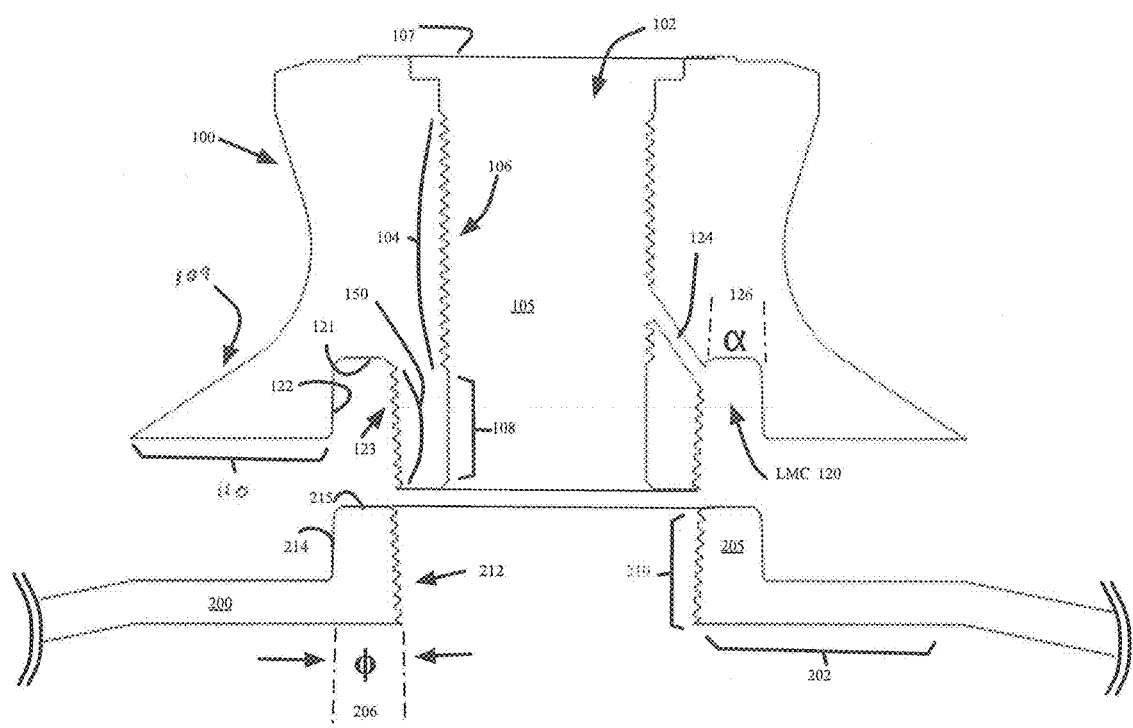
FIGS. 6A-6C show the sequential mounting of a boss closure assembly to a liner and the forming of a pressure vessel.
Figure 6B:
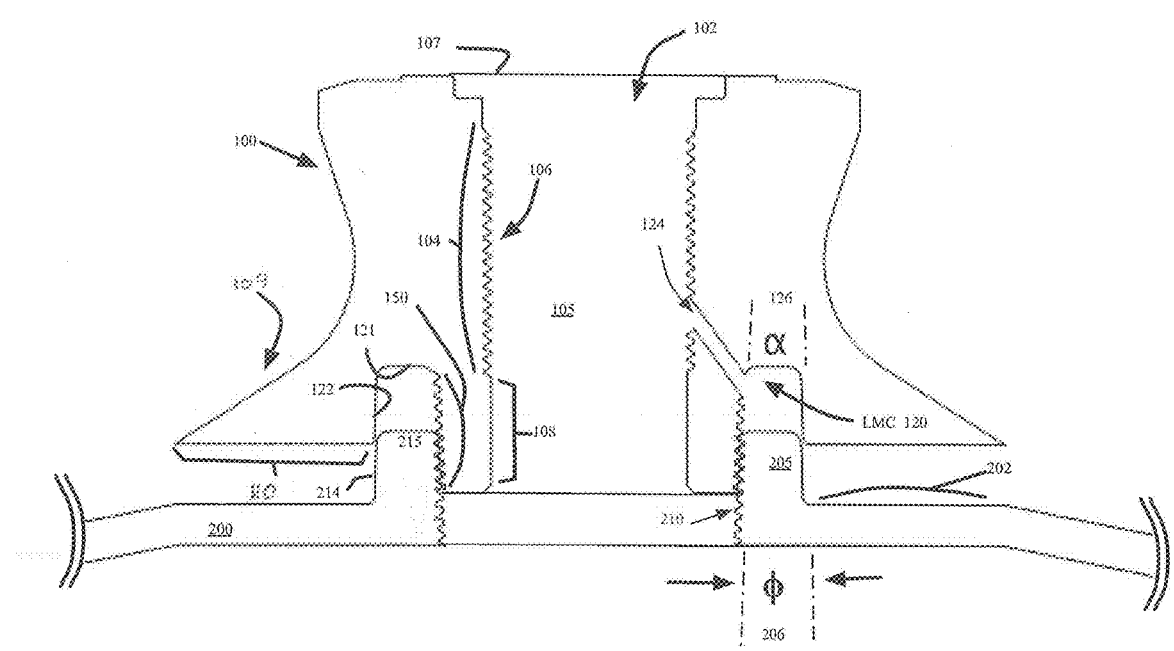
Figure 6C:
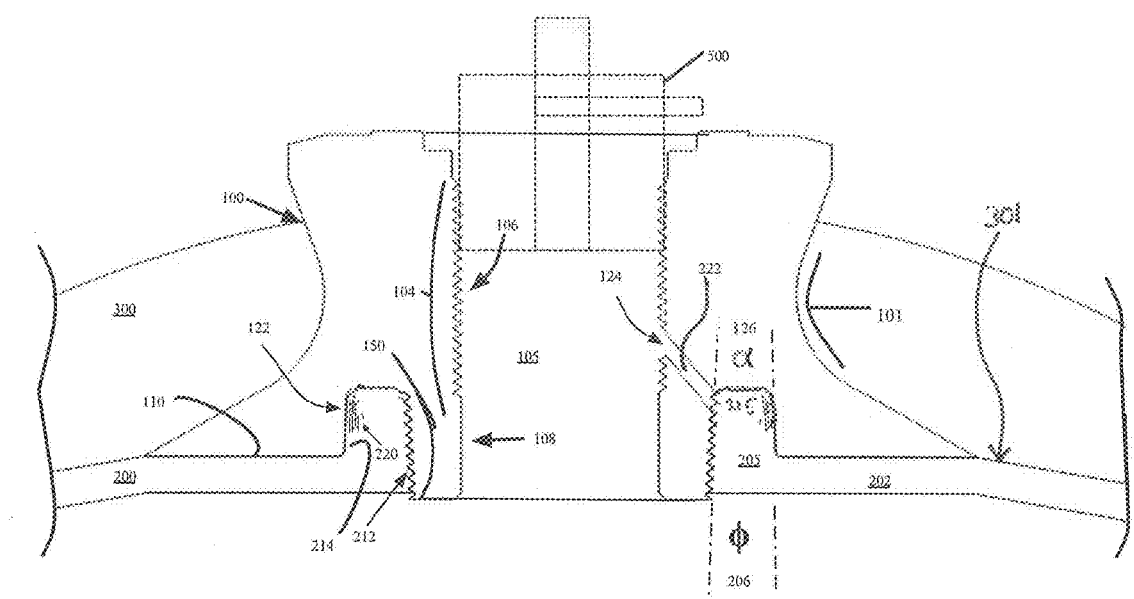

While the specification concludes with claims defining the features of the present disclosure that are regarded as novel, it is believed that the present disclosure's teachings will be better understood from a consideration of the following description in conjunction with the appendix, figures, in which like reference numerals are carried forward. All descriptions and callouts in the Figures are hereby incorporated by this reference as if fully set forth herein.

Further Description

According to one or more exemplary implementations, as shown in FIGS. 5-9 are aspects of devices, systems and methods to form a pressure vessel. A pressure vessel 50 has a tank body 75, a boss 100 sealed to a liner 200 and wrappings around the liner-boss combination with filament material in a binding solution or material whereby the filaments form a wrapping support layer 300 around the liner and boss. The support layer 300 forms an outer shell around the liner and a portion of the boss. The interface between the liner and wrappings in also referred to as the underside of the wrapping 301.

The boss 100 is affixed to the liner 200 at the polar end 202 of the liner at the liner neck 205 fluidly connecting to the liner orifice 207. The boss can be used to connect dissimilar materials forming the pressure vessel. The liner neck 205 is in some instances a substantially smooth plastic ring with an inner ring wall 212 and outer ring wall 214 and a top wall 215 which is a leading edge 215 of the ring shaped neck and which fours an opening that is in fluid communication with a pressure chamber 11. In some instances the neck's inner annular wall 212 is non-smooth. In some instances the neck's inner annular wall 212 is threaded 210, with helical neck threads, to cooperate with the helical threads of the boss. The neck 205 is tapered with an angle φ 206. The neck 205 mates with liner mounting connection (LMC) formed in the boss 100.

The boss 100 has an elongated body 101 which defines a fluid connection 102 into a pressure chamber 11 surrounded by the liner 200. An annular channel wall 104 forms the passage 105 which may be threaded 106 that is part of the fluid connection 102. The open top 107 of the channel wall can receive connections to valves 500, pipes and other fill or outlet devices. Such outlet devices or valves may have corresponding threads for mounting to create a sealed pressure chamber. The distal end of the boss is connected to the liner 200 and the pressure vessel 50. The top of the channel 107 is at the top of the fluid connection 102 and forms a passage into the pressure vessel. At the bottom of the channel wall 104 is an extended leg 108 of the channel wall. The body has a bottom end which is extended laterally forming a flange 109. The leg 108 is extended because it extend beyond the flange's substantially flat bottom 110. The flange bottom 110 is the portion of the flange which fits over the polar end 202 of the liner forming part of the mounting of boss to liner. The LMC 120 is a groove adapted to be threadably engaged with the neck 205 of the liner. The LMC groove has a top 121 an outer annular wall 122 which is substantially smooth and an internal annular wall 123 which is helically threaded 150. A migration pathway 124 is formed from the LMC which fluidly connects to the passage 105.

The orientation of the inner and outer annular walls is such that they can be defined by angle α 126. Angle α 126 and angle φ 206 should correspond to one another for sealed engagement. Correspond does not mean fit or mate. The mating of the liner and boss at the neck 205 and LMC 120 is a forced engagement whereby the softer material of the neck is at least one of some instances compressed, deformed and distorted during mounting. Depending on the intended use, weight requirements and the like the liner may be a plastic or other lightweight material. Plastics may be advantageous due to their low weight and easy for molding. However, it is within the scope of this disclosure that a liner may be metallic and metallic such as aluminum. The liner may be a composite or hybrid material. Characteristics of the liner include it being non-reactive with the gaseous fuel store therein.

The mating of the liner and boss at the neck 205 and LMC 120 is a forced engagement whereby the softer material of the neck is at degraded whereby at least some portion of the material is at least one of removed, dislodged, and displaced by irreversible smearing or stretching beyond a point of memory or return during mounting.

The neck 205 of the liner may be threaded 210 to mate with the threads 150 of the LMC. The threaded connection via the tapered neck into the tapered LMC provides positional guidance and strength. Each male and female thread cooperate to provide support for the connection as the flange is rotated onto the neck. At the same time the threaded mating keeps the flange bottom 110 substantially flat relative to the polar end 202.

There exist a very wide variety of threading patterns such as those under the UTS (Unified Thread Standard), acme, square, buttress, NPT, angular, and bulb. Threading patterns can be described by thread angle, thread count and thread pitch. In mating a threaded elements to one another, particularly in a reversible fashion, having corresponding threadings is essential. Those of ordinary skill in the art will recognize that the scope of this disclosure encompasses the above variations in threading.

In some instances the threadings may be non-homogeneous. A perfect match for threading a neck of soft material to a harder boss may be disadvantageous when trying to produce a very strong one-way mounting as opposed to a reversible mating. Non-homogeneity may be in thread angle, thread pitch, taper and type of threads.

It has been determined through testing that threading the outer ring wall 214 can be disadvantageous to providing a pathway to relieve the pressure caused by gas migrating from the liner. In addition, the non-threading provides a pathway for directing the gaseous fuel which will migrate from the chamber 11 through the liner 200 to the migration passage 124 and thus redirects the fuel which has migrated out into the passage 105. The transport of migrating gas out of the tank structure is important as it reduces or eliminates pressure build up at the interface of the boss and liner.

The smooth outer ring wall 214 is forcibly pressed against the outer annular wall 122 of the boss whereby the surface to surface interface places the softer neck 205 under a compressive load and forces the ring structure of the neck at the smooth outer ring wall to engage the outer annular wall very firmly buttressing the neck ring and placing compressive load 220 at the metal boss to plastic liner interface of smooth liner neck wall to smooth boss outer annular wall and wherein the threading 150 from the inner annular wall of the boss engages the threading 210 and mounts the boss to the polar end. The angulation of the neck and of the LMC provide space and for a substantially easier mating of the boss to neck at the initial stages of mounting (during rotation) with the amount of force needed to complete the connection of the flange bottom 110 to the polar end 202 increasing as the bottom of the flange and the liner's polar end draw nearer.

When the helical threads have been fully engaged thus connecting the boss to the liner adjacent to the leading edge 215 of the top wall is a void 222. The void 222 is a cavity in the boss which forms a fluid connection from the LMC 120 to the passage 105. The LMC boarders, abut or is otherwise adjacent to the migration passage 124 which is a low density region also referred to as a void. In this instance the migration passage could contain material but it needs to be of a lower density than the liner and boss. When a valve 500 or other connection is added to the fluid connection 102 the void can become part of a sealed region of low density as it lacks plastic liner material and is filed gas. The void is a zone for the migrating fuel gas to collect wherein it is directed thru this migration passage 124. Gas will migrate out of a plastic liner and is captured inside or underneath the wrappings. That gas will seek a path out of the vessel. The migration passage directs gas flow from the liner into the void. Without the migration passage, which acts as an escape path, the gas pressure in the liner or the underside of the wrappings 300 at or near the LMC can become larger than the internal gas pressure and will push the liner material out of the LMC or otherwise corrupt the seal.

The liner is dense but porous. Gases the high pressure within the gas chamber 11 will push some of the gas under pressure through the liner, this is a process that takes time, the time may be hours, days or even weeks. Once the gas is within the liner material it is typical for the gas in the vessel to be output for use. It is also typical vessel to be refilled. In those instance of unfill and refill a pressure differential is created wherein the gas pressure in the liner (of gas migrating through or in the liner 200) exceeds the pressure inside the gas chamber 11. At least some of that gas may have migrated through the liner and is trapped at or near the underside of the wrappings 301. Traditionally, when the pressure in the gas chamber is less than the pressure of the migrated gas, the gas will seek an escape route, the connection of the boss to the liner is a place where the pressurized migrated gas will press on and may corrupt the seal. Disclosed herein is a migration passage 124 that reduces or substantially eliminates that risk and the damage to the seal.

Hence by having a void or lower density material in the migration passage the migrated gas which seeks an escape route will flow into the boss via the migration passage 124 and will not corrupt the seal.

Figure 7A:
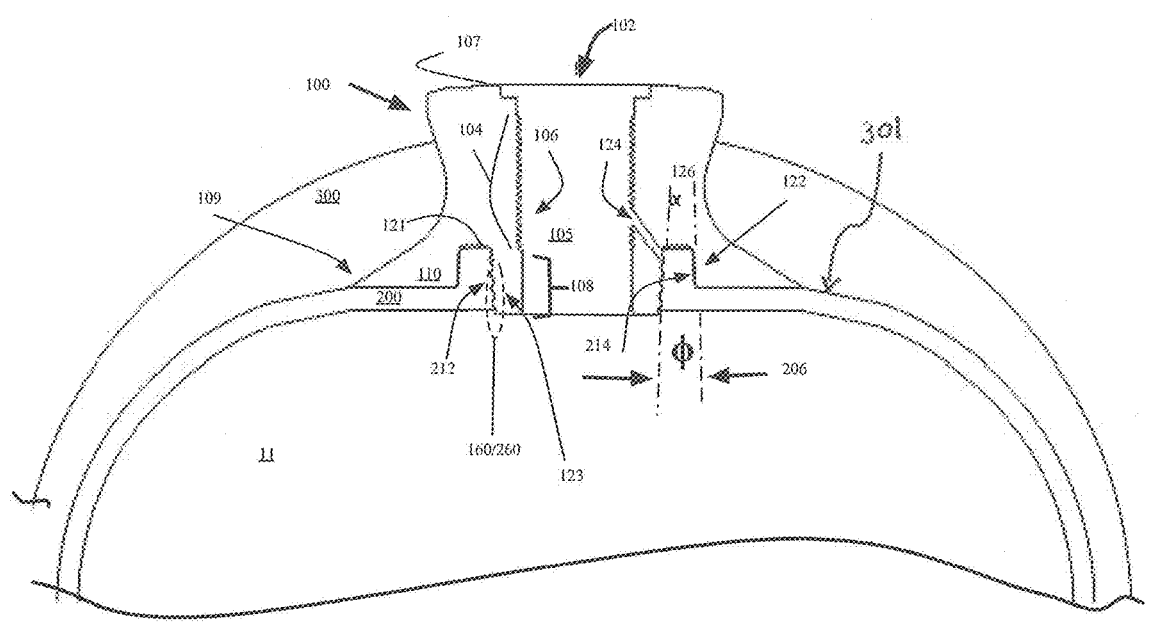
FIGS. 7A and 8B show some aspects of threading alternative for a boss closure assembly.
Figure 7B:
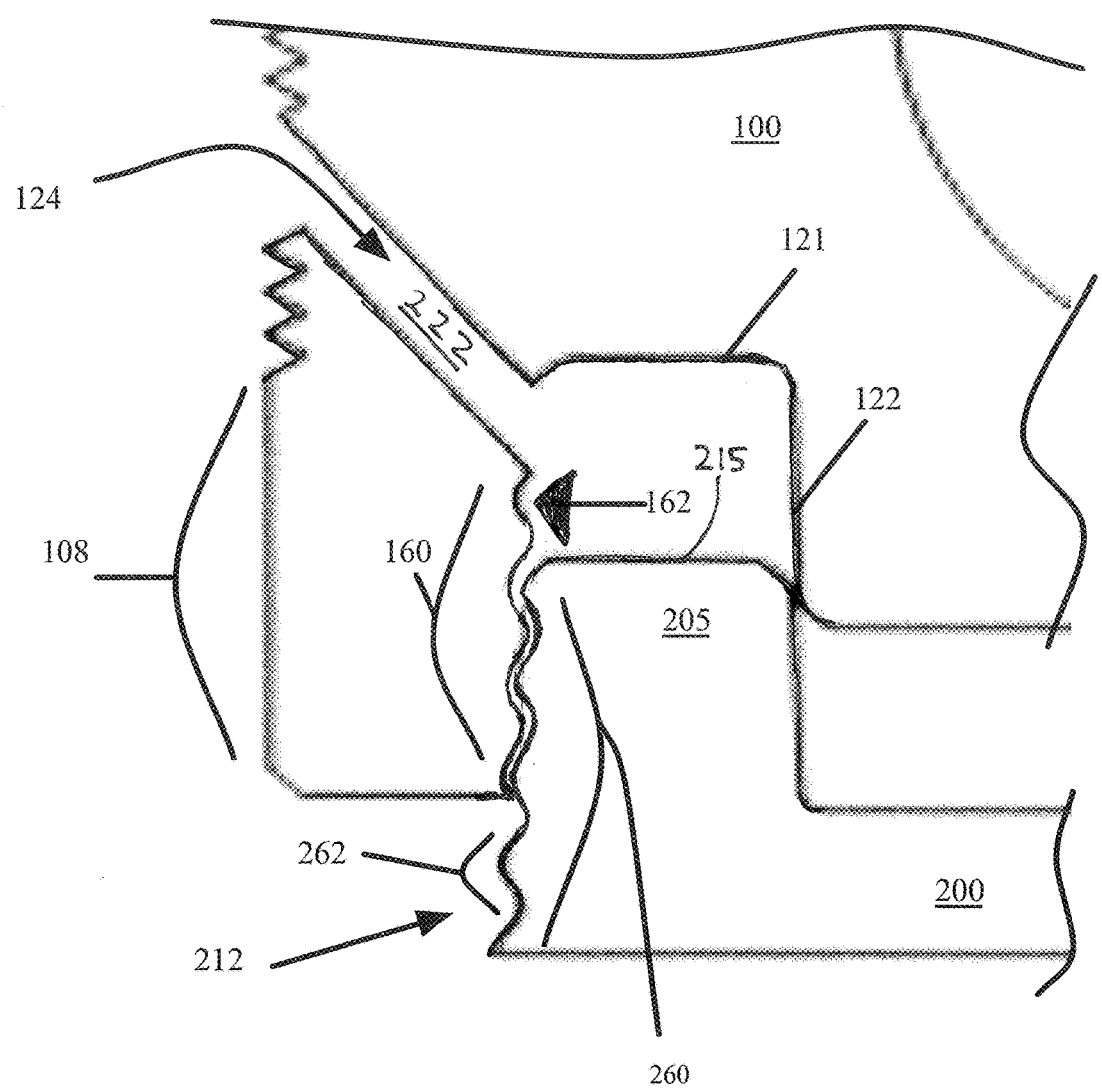

FIGS. 7A and 7B show an alternate threading arrangement for connecting the boss 100 to neck 205 of the liner 200. FIG. 7A shows the fully mounted boss and associated threads and void 222. FIG. 7B shows a close up of the intermediary assembly wherein the boss is being threaded onto the liner but before the LMC 120 has been fully engaged and before the flange bottom 110 is connected to the liner's polar end 202. The orientation of the inner and outer annular walls is such that they can be defined by angle α 126. Angle α 126 and angle ϕ 206 should correspond to one another for sealed engagement. Correspond does not mean fit or mate. The mating of the liner and boss at the neck 205 and LMC 120 is a forced engagement whereby the softer material of the neck is at least one of some instances compressed, deformed and distorted during mounting. The mating of the liner and boss at the neck 205 and LMC 120 is a forced engagement whereby the softer material of the neck is at degraded whereby at least some portion of the material is at least one of removed, dislodged, and displaced by irreversible smearing or stretching beyond a point of memory or return during mounting.

The neck 205 of the liner may be threaded 260 to mate with the threads 160 of the. an internal annular wall 123. the complementary threads 160/260 are a bulb type thread characterized by a smooth radius 162/262 transitioning into another smooth radius.

Figure 8A:
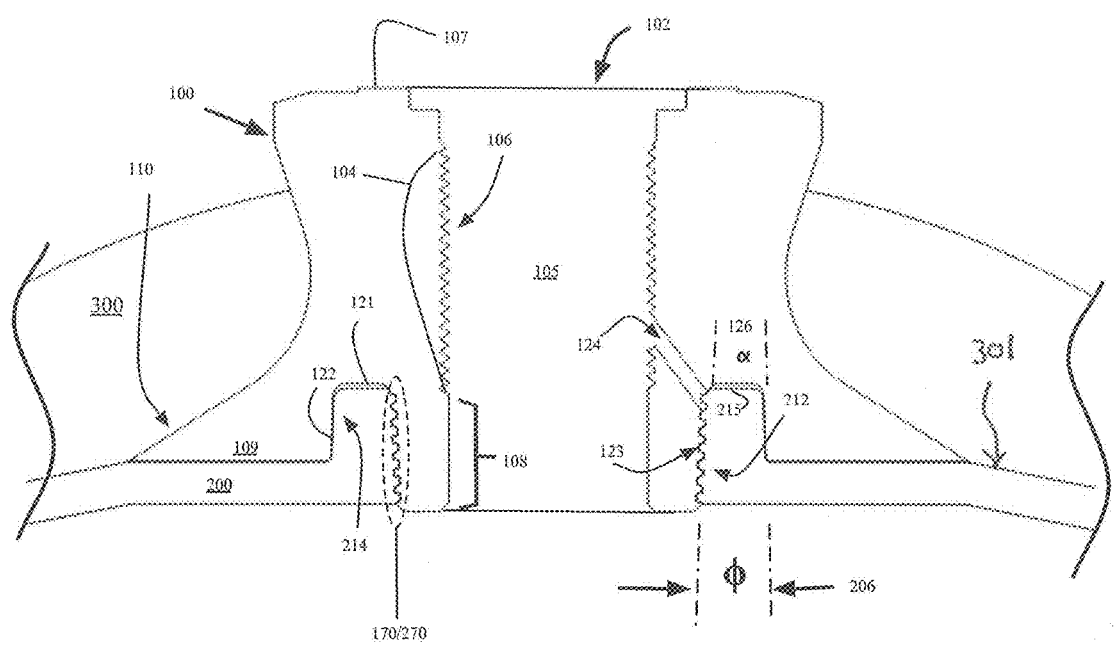
Figure 8B:
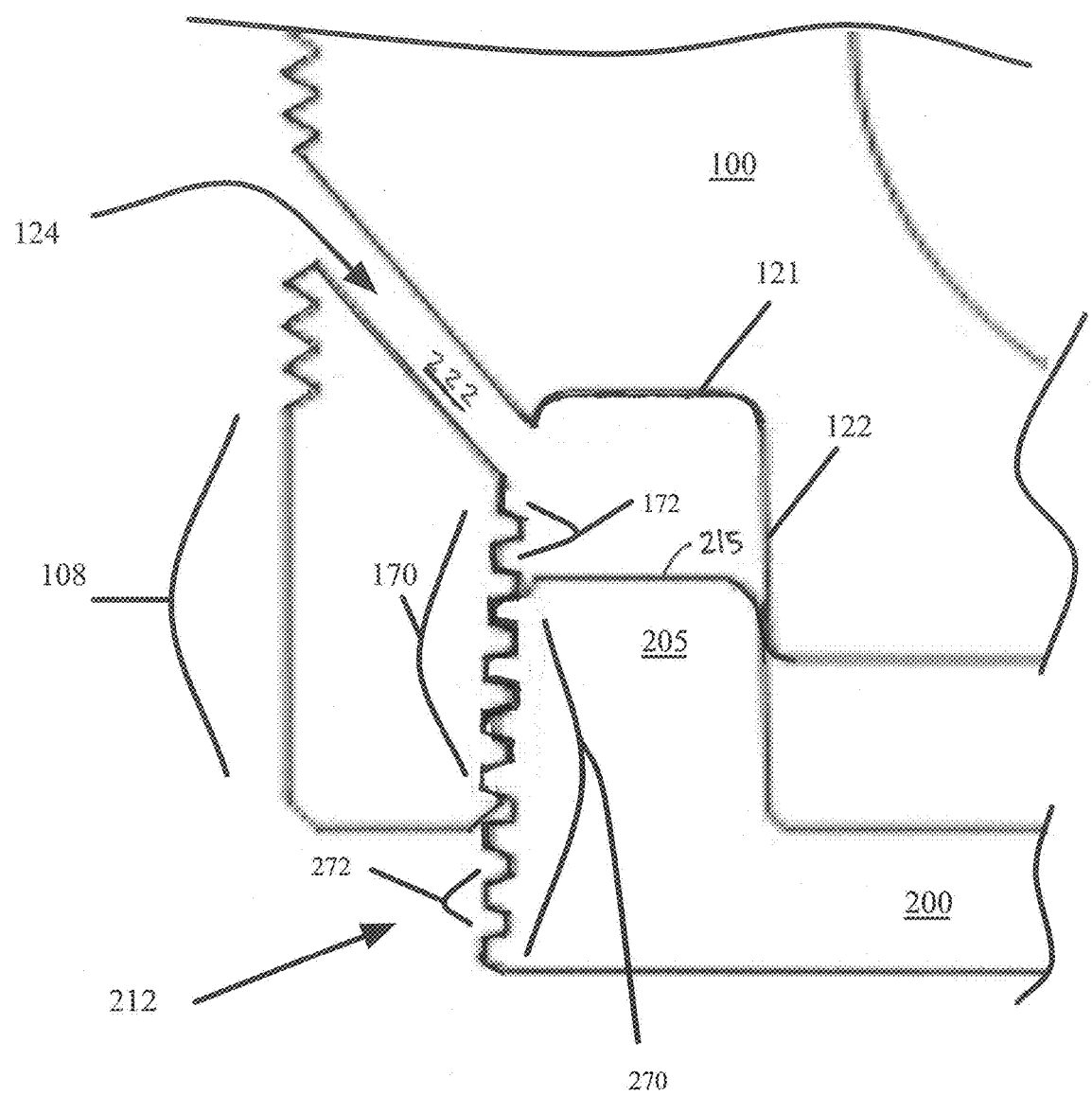

FIGS. 8A and 8B show an alternate threading arrangement for connecting the boss 100 to neck 205 of the liner 200. FIG. 8A shows the fully mounted boss and associated threads and void 222. FIG. 8B shows a close up of the intermediary assembly wherein the boss is being threaded onto the liner but before the LMC 120 has been fully engaged and before the flange bottom 110 is connected to the liner's polar end 202. The orientation of the inner and outer annular walls is such that they can be defined by angle α 126. Angle α 126 and angle ϕ 206 should correspond to one another for sealed engagement. Correspond does not mean fit or mate. The mating of the liner and boss at the neck 205 and LMC 120 is a forced engagement whereby the softer material of the neck is at least one of some instances compressed, deformed and distorted during mounting. The mating of the liner and boss at the neck 205 and LMC 120 is a forced engagement whereby the softer material of the neck is at degraded whereby at least some portion of the material is at least one of removed, dislodged, and displaced by irreversible smearing or stretching beyond a point of memory or return during mounting.

The neck 205 of the liner may be threaded 270 to mate with the cooperating threads 170 of. internal annular wall 123. the complementary threads 170/270 are a NPT (national pipe type). The taper on NPT threads allows them to form a seal when torqued as the flanks of the threads compress against each other, as opposed to parallel/straight thread fittings or compression fittings in which the threads merely hold the pieces together and do not provide the seal.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A pressurized-gas storage boss assembly for directing migrated gas through a migration passage, the pressurized-gas storage boss assembly comprising:
    a liner (200) defining a gas storage chamber (11) and having a polar end (202) portion with a substantially planar surface, having an access opening (18) on the planar surface which is in fluid communication with the gas storage chamber, the liner further including a raised circular neck ring (205) extending from the planar surface and surrounding the access opening, the raised circular neck ring having a smooth outer ring wall (214), a top wall (215) and an inner annular wall (212), with a set of helical neck threads (210) provided on the inner annular wall;
    a boss (100) having a longitudinally extending body (101) that has a top surface (107), a bottom end of the body which is extended laterally forming a flange (109) having a planar bottom surface (110) with a fluid connection (102) to serve as a fluid passageway through the boss to the gas storage chamber, the boss further including a liner mounting connection (120) on the planar bottom surface (110), the liner mounting connection (LMC) has a groove adapted to be threadably engaged with the raised circular neck ring including a top (121), an outer annular wall (122) which is substantially smooth, and an internal annular wall (123) which is helically threaded (150) to engage the neck threads (210);
    a support layer (300) forming an outer shell around the liner (200) and at least a portion of the boss (100), wherein a shell/liner interface (301) is disposed between the support layer (300) and the liner (200) and if the gas in the storage chamber (11) migrates through the liner (200), the migrated gas flows along the shell/liner interface (301);
    a boss/liner interface defined by a first interface disposed between the planer bottom surface (110) and the polar end (202), a second interface disposed between the outer annual wall (122) and the smooth outer ring wall (214), and a third interface disposed between the top (121) and the top wall (215), wherein the boss/liner interface is in fluid connection with the shell/liner interface (301) and the boss/liner interface is configured to convey the migrated gas to flow therethrough;
    wherein the boss is configured to be screwed onto the liner, via the raised circular neck ring such that the helical neck threads (210) are engaged with the corresponding helical threads of the internal annular wall;
    wherein the fluid connection of the boss further comprises an annular channel wall (104) forming a passage (105);
    wherein the boss further comprises a migration passage (124) configured to receive the flow of migrated gas from the boss/liner interface and convey the migrated gas into the chamber via the passage (105), and
    wherein the migration passage (124) is in fluid communication with the boss/liner interface via a pathway for directing the migrated gas, the pathway comprising the non-threaded interface between the outer annular wall and smooth outer ring wall, such that the migrated gas is permitted to flow from the boss/liner interface into and through the migration passage (124) and into the passage (105).

2. The pressurized-gas storage boss assembly of claim 1, the assembly further comprising an extended leg (108) of the channel wall.

3. The pressurized-gas storage boss assembly of claim 1, wherein the circular neck ring is tapered at an angle of φ (206) corresponding to an angular taper α (126) of the LMC.

4. The pressurized-gas storage boss assembly of claim 1, wherein when the helical threads of the liner neck and the boss groove have been engaged a void is created between the LMC and gas chamber via the migration passage.

5. The pressurized-gas storage boss assembly of claim 4, wherein migrated gas in the liner will migrate to and through the migration passage.

6. The pressurized-gas storage boss assembly of claim 1, wherein:
    the raised circular neck ring comprises a softer material than the boss; and
    the mating of the liner and the boss is a forced engagement whereby at least some portion of the raised circular neck ring is at least one of removed, dislodged, and displaced by irreversible smearing or stretching beyond a point of memory or return.

7. The pressurized-gas storage boss assembly of claim 1, wherein:
    the set of helical neck threads provided on the inner annular wall, the helically threading of the internal annular wall (123), or both are non-homogeneous in one or more of thread angle, thread pitch, taper, and type of threads.

8. A pressurized-gas storage vessel, comprising:
    a liner defining a gas storage chamber and having a polar end portion with a substantially planar surface, having an access opening on the planar surface which is in fluid communication with the gas storage chamber, the liner further including a raised circular neck ring extending from the planar surface and surrounding the access opening, the raised circular neck ring having a smooth outer ring wall, a top wall, and an inner annular wall, with a set of helical neck threads provided on the inner annular wall;
    a boss having a longitudinally extending body that has a top surface, a bottom end of the body which is extended laterally forming a flange having a planar bottom surface with a fluid connection to serve as a fluid passageway through the boss to the gas storage chamber, the boss further including a liner mounting connection (LMC) on the planar bottom surface, the LMC having a groove adapted to be threadably engaged with the raised circular neck ring, the LMC including a top, an outer annular wall which is substantially smooth, and an internal annular wall which is helically threaded to engage the set of helical circular neck threads;

a support layer (300) forming an outer shell around the liner (200) and at least a portion of the boss (100), wherein a shell/liner interface (301) is disposed between the support layer (300) and the liner (200) and if the gas in the storage chamber (11) migrates through the liner (200), the migrated gas flows along the shell/liner interface (301);

a boss/liner interface defined by a first interface disposed between the planer bottom surface (110) and the polar end (202), a second interface disposed between the outer annual wall (122) and the smooth outer ring wall (214), and a third interface disposed between the top (121) and the top wall (215), wherein the boss/liner interface is in fluid connection with the shell/liner interface (301) and the boss/liner interface is configured to convey the migrated gas to flow therethrough;

wherein the boss is configured to be screwed onto the liner via the raised circular neck ring such that the set of helical neck threads are engaged with the corresponding helical threads of the internal annular wall;

wherein the fluid connection of the boss further comprises an annular channel wall forming a passage; and wherein the boss further comprises a migration passage (124) configured to receive the flow of migrated gas from the boss/liner interface and convey the migrated gas into the chamber via the passage (105), and wherein the migration passage (124) is in fluid communication with the boss/liner interface via a pathway for directing the migrated gas, the pathway comprising the non-threaded interface between the outer annular wall and smooth outer ring wall, such that the migrated gas is permitted to flow from the boss/liner interface into and through the migration passage (124) and into the passage (105).

9. The pressurized-gas storage vessel of claim 8, wherein the circular neck ring is tapered at an angle of φ (206) corresponding to an angular taper α (126) of the LMC.

10. The pressurized-gas storage vessel of claim 8, wherein when the helical threads of the liner neck and the boss groove have been engaged, the leading edge of the top wall boarders a void in the boss; and, wherein the migration passage is part of a region of low density, the migration passage lacking plastic liner material and being filled with gas.

11. The pressurized-gas storage vessel of claim 9, wherein when the helical threads of the liner neck and the boss groove have been engaged fully the leading edge of the top wall boarders a void in the boss; and, wherein the migration passage comprises a region of low density lacking plastic liner material and filled with gas.

12. The pressurized-gas storage vessel of claim 8, wherein when the helical threads of the liner neck and the boss groove have been engaged fully the leading edge of the top wall forms a void (222) wherein the LMC of the boss is fluidly connected to the passage; and when the fluid connection (102) is sealed with a valve (500) the void of the migration passage comprises a sealed cavity and a region of low density lacking plastic liner material.

13. The pressurized-gas storage vessel of claim 8, wherein:

the raised circular neck ring comprises a softer material than the boss; and the mating of the liner and the boss is a forced engagement whereby at least some portion of the raised circular neck ring is at least one of removed, dislodged, and displaced by irreversible smearing or stretching beyond a point of memory or return.

14. The pressurized-gas storage vessel of claim 8, wherein:

the set of helical neck threads provided on the inner annular wall, the helically threading of the internal annular wall (123), or both are non-homogeneous in one or more of thread angle, thread pitch, taper, and type of threads.

15. A method of preventing sealing failure between a boss and liner of a pressurized-gas storage vessel, the method comprising:

providing a low density void (222) in the fluid connection of a migration passage (124) formed in a boss (100) connected to a plastic liner (200) having a gas chamber (11) wrapped in wrapping (300) material, with the wrapping (300) forming an outer shell around the plastic liner (200) and at least a portion of the boss (100);

wherein the boss further has a passage (105) in fluid connection to the gas chamber;

wherein the wrapped plastic liner forms a vessel with a shell/liner interface (301) disposed between the wrapping (300) and the plastic liner (200) and if the gas in the gas chamber (11) migrates through the plastic liner (200), the migrated gas flows along the shell/liner interface (301); and, wherein gas that migrates from the gas chamber into the shell/liner interface (301) will travel to the low density void through the migration passage (124) and into the passage (105) and relieve pressure build up outside of the gas chamber;

wherein liner comprises a raised circular neck ring extending from a planar surface and surrounding an access opening, the raised circular neck ring having a smooth outer ring wall, a top wall, and an inner annular wall, with a set of helical neck threads provided on the inner annular wall;

wherein the boss comprises a liner mounting connection having a groove adapted to be threadably engaged with the raised circular neck ring, the liner mounting connection including a top, an outer annular wall which is substantially smooth, and an internal annular wall which is helically threaded to engage the set of helical circular neck threads;

wherein the boss is screwed onto the liner via the raised circular neck ring such that the set of helical neck threads are engaged with the corresponding helical threads of the internal annular wall and the outer annual wall is engaged with the smooth outer ring wall; and wherein a non-threaded interface between the outer annular wall and smooth outer ring wall provides a pathway for directing the gas which will migrate from the chamber (11) through the plastic liner (200) to the migration passage (124) and thus redirects the fuel which has migrated out into the passage (105).

16. The method of claim 15, the method further comprising:

a fluid connection through the open top of the boss with a threaded passageway open into the pressure chamber surrounded by the liner; and, a valve (500) threaded into the passageway seals the pressure chamber.

17. The method of claim 15, the method further comprising:

screwing the boss onto the liner via the raised circular neck ring via a forced engagement whereby at least some portion of the raised circular neck ring is at least one of removed, dislodged, and displaced by irreversible smearing or stretching beyond a point of memory or return.

18. The method of claim 15, wherein:

the set of helical neck threads provided on the inner annular wall, the helically threading of the internal annular wall (123), or both are non-homogeneous in one or more of thread angle, thread pitch, taper, and type of threads.

* * * * *